(12) United States Patent
Ofcharsky et al.

(10) Patent No.: US 6,422,781 B1
(45) Date of Patent: Jul. 23, 2002

(54) SPACER COUPLER

(75) Inventors: John Ofcharsky, Olyphant; Thomas J. Gretz, Clarks Summit, both of PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/181,889

(22) Filed: Oct. 29, 1998

(51) Int. Cl.[7] ................................................. F16B 19/00
(52) U.S. Cl. ..................... 403/300; 174/59; 411/913; 439/650; 403/309
(58) Field of Search ................... 403/300, 301, 403/302, 306, 326, 329, 309; 174/53, 59, 49; 439/650; 411/508, 509, 913

(56) References Cited

U.S. PATENT DOCUMENTS 1,918,282 A * 7/1933 Meuer
2,889,437 A * 6/1959 Christiensen
4,495,548 A * 1/1985 Matsui
4,893,978 A * 1/1990 Frano
5,716,161 A * 2/1998 Moore et al.

* cited by examiner

*Primary Examiner*—Lynne H. Browne
*Assistant Examiner*—Tomlyne A Malcolm

(57) ABSTRACT

A spacer coupler for ganging together two or more wall outlets by coupling the outlets together in a spaced manner. The outlets are fastened to the spacer coupler by spear connectors on the spacer coupler which are inserted into complimentary holes in the wall outlets. The spacer coupler can be used with existing communication cable receptacles and face plates to form a pleasing and easily accomplished ganging of the receptacles.

3 Claims, 5 Drawing Sheets

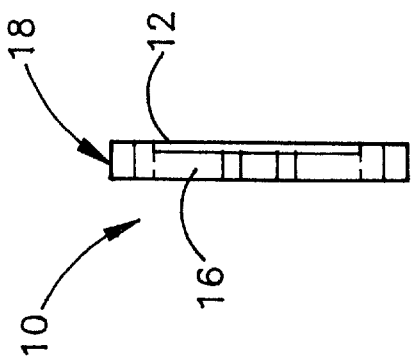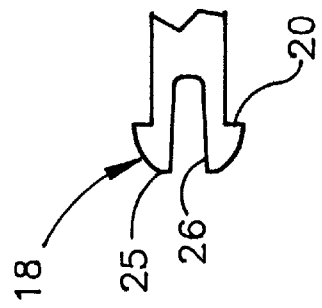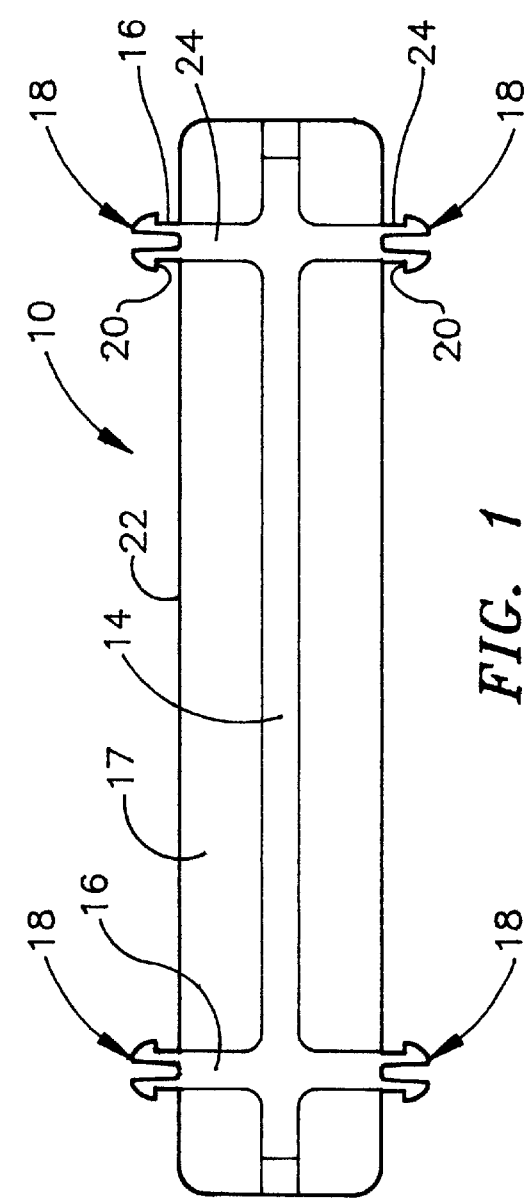

SPACER COUPLER

The present invention relates to a spacer coupler especially for ganging a plurality of wall mountings for communication cables together. When communication television cable, fiber optics or similar low voltage communication cables have multiple mountings at a single location in a building, there is one principle way of doing it. This is to punch a hole in the wall and insert a box to bring the cable through the box, which each one of the multiple outlets inserted on an individual basis.

SUMMARY OF THE INVENTION

The present invention relates to a space coupler that permits the ganging together of a number of generally rectangular outlets for mounting in a single opening in the wall. The spacer coupler includes a coupling arrangement for connecting a spacer to each of the outlets which are then placed in a single generally rectangular opening in the wall. Clamping devices on the rectangular outlets are used for clamping them to the wall.

BRIEF DESCRIPTION OF THE DRAWINGS

FIG. 1 is a plan view of a spacer coupler of this invention.

FIG. 2 is a side view of FIG. 1

FIG. 3 is a top view of FIG. 1

FIG. 4 is a broken away schematic section of the spear connector of FIG. 1

With reference to FIG. 1, as shown in the plan view, the spacer coupler 10, is generally rectangular in shape, having a flat base 12 and reinforcing ridges 14. The reinforcing ridges have cross-members 16 extending to the periphery of the side of the spacer coupler. At each end of the cross members are spear connectors 18, the ends of which are better seen in FIG. 4. The spear connector 18 extends beyond the edge of the spacer coupler; so that locking notches 20 extend beyond the spacer side wall 22 a distance so that the standoff space 24 is either the same thickness or slightly larger than the thickness of the side of an outlet with which the spear connectors are engaged. The end of the spear connectors 25 are rounded or pointed and divided by a valley 26 which extends to the depth of the spear connector which coincides with the spacer side wall 22. The valley permits the two ends of the spear connector to be displaced inward toward one another so that the locking notches can pass through the hole of the side wall of a rectangular outlet and then return to their normal position for locking the spacer coupler to the sidewall.

FIGS. 2 and 3 are respectively a side view of FIG. 1 and a top view of FIG. 1 with the same numbers for the same elements.

With reference to FIG. 5 there is shown a top view of a gang of two generally rectangular outlets 28 which are separated by spacer coupler 10. The schematic view can be extended using the outboard spacer couplers for ganging additional rectangular outlets to the couplers. If there are only two outlets then only a single spacer coupler would be utilized. The rectangular outlet 28 is in the form of a plastic mounting device of the type shown in U.S. pending patent application Ser. No. 08/935,144, filed on Sep. 22, 1997, and commonly owned by the present assignee. This application is a more full disclosure of this type of mounting device is referred to and is hereby made a part of the present disclosure. It has a flange 30 for extending along the surface of the room side of a building wall.

With reference to FIG. 6, which is a rearward view of FIG. 5, the flange 30 is at right angle to sidewall 32 which extends through an opening in a wall. The flags 34 are arranged to lie inside the side wall 32 prior to insertion in a building wall and extend through the opening in the building wall to the opposite side from the flange where the flags are rotated into position and tightened to clamp the outlet 28 to the building wall between the flag and the flange in a manner more fully described in the above identified co-pending patent application.

Figure 5:
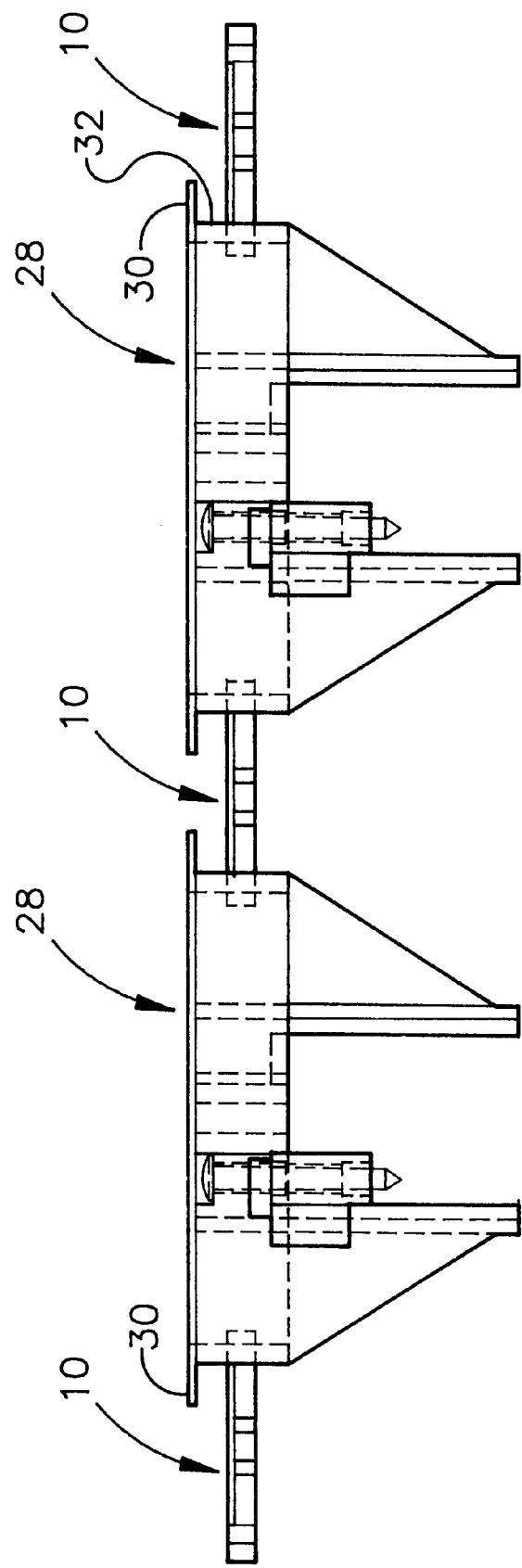
FIG. 5 is a schematic top view of the spacer coupler of this invention connected to generally rectangular outlets arranged in a gang.
Figure 6:
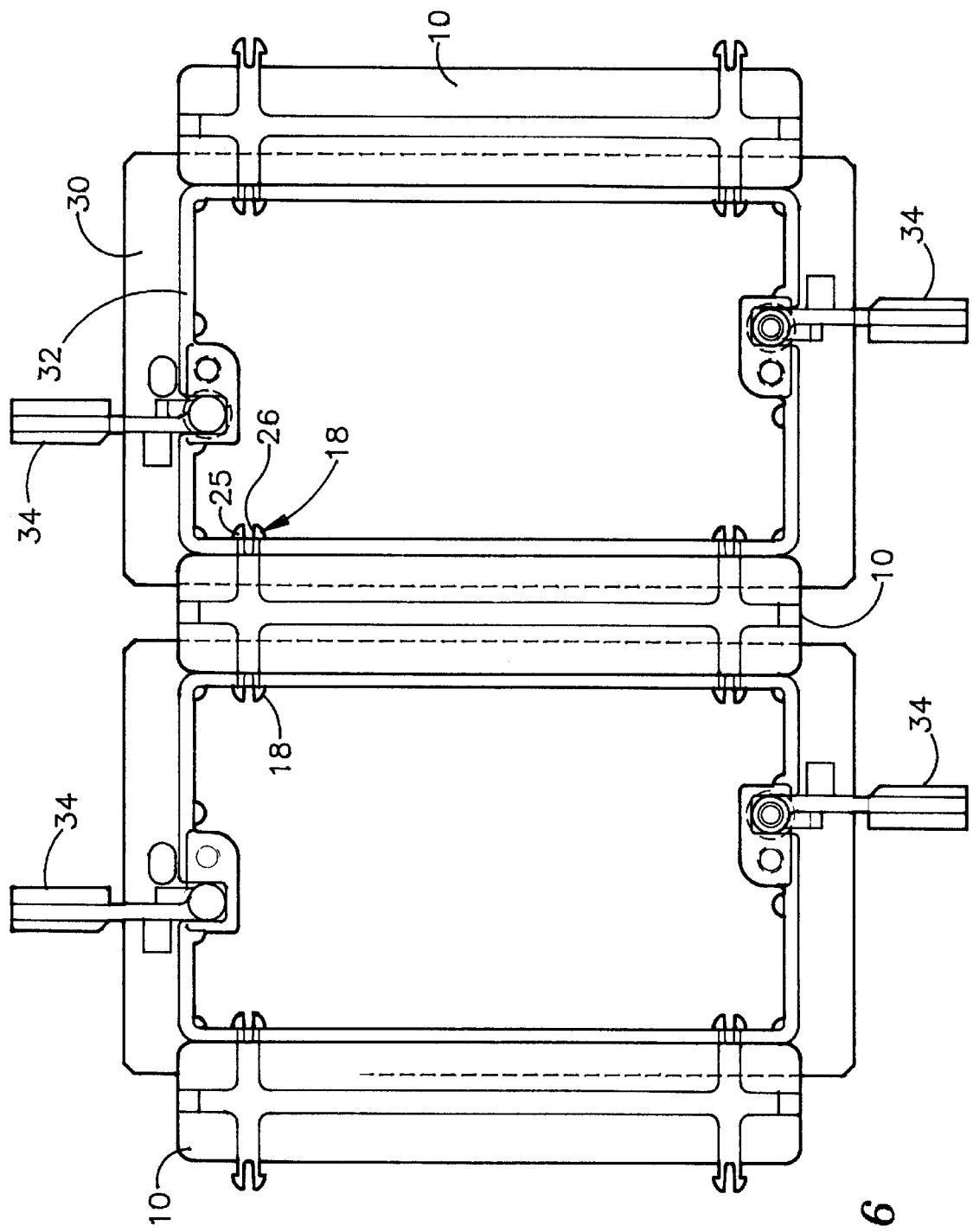
FIG. 6 is a rear view of FIG. 5.

It can be seen from FIG. 6 that the thickness of the side wall 32 is either the same thickness or slightly smaller than the distance between the locking notches 20 and the spacer side wall 22 of the spacer coupler. Also it can be seen that the spacer side wall 22 of the spacer coupler is in contact throughout it's length to the side wall 32 of the rectangular outlet and is of a length no greater than the length of the side wall 32 of the outlet.

Figure 7:
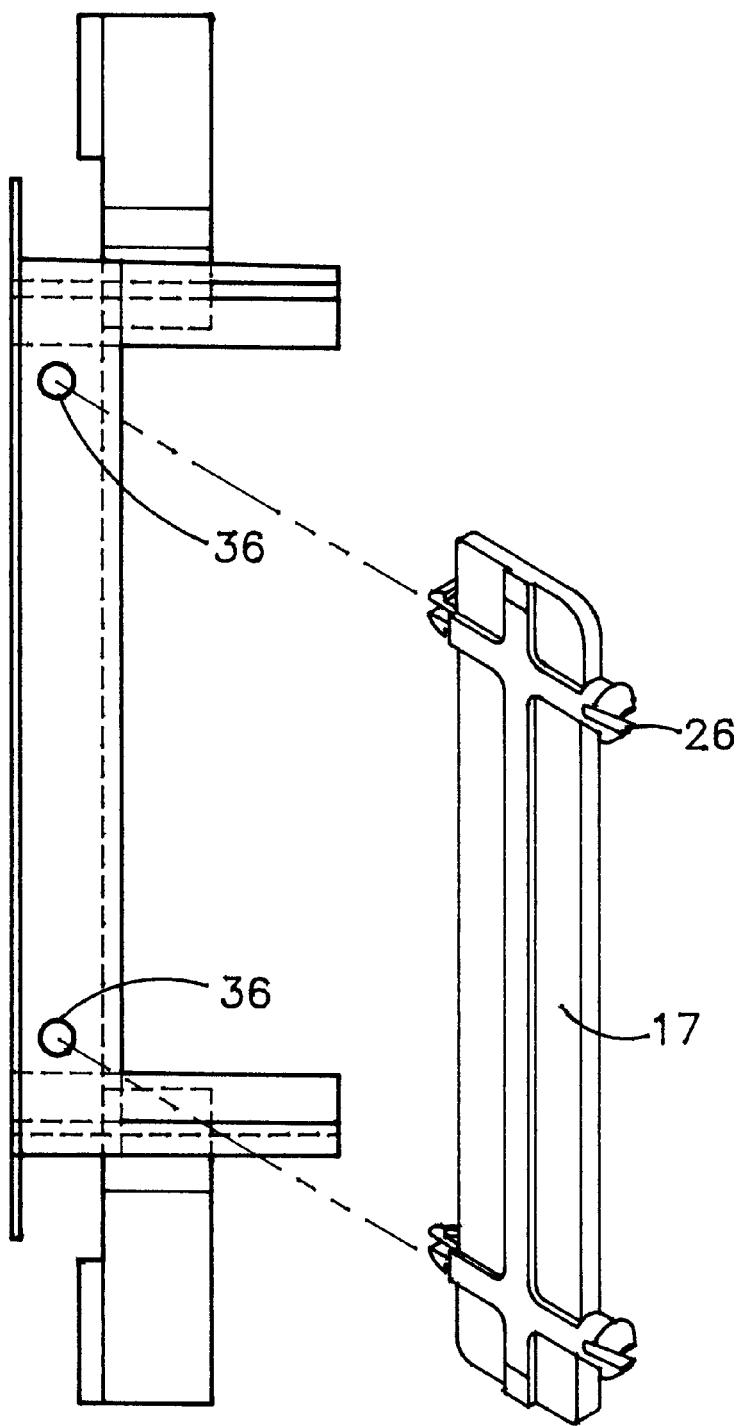
FIG. 7 is a schematic exploded view showing how the spacer coupler is inserted into a rectangular outlet.

With reference to FIG. 7, there is shown an exploded schematic view of a spacer coupler prior to being assembled with the rectangular outlet 28 and side holes 36. The rectangular outlet 28 and spacer coupler 10 are fastened together by forcing inward the rounded or pointed ends of the spear connectors to partially close the valley 26. This force is applied by the walls of the orifice 36 so that the spear can be pushed through orifice 36 where the notches snap out and return to their normal position to lock the spear connectors between their locking notches and the spacer side wall 22 of the spacer coupler.

The reinforcing ridges 14 and cross members 16 add strength to help rigidify the spacer coupler and form a base for the spear connectors. The ridges and cross members are approximately 0.125 inches thick. The thin section 17 other than the ridges, cross members and spear connectors is approximately 0.031 inches thick.

Figure 8:
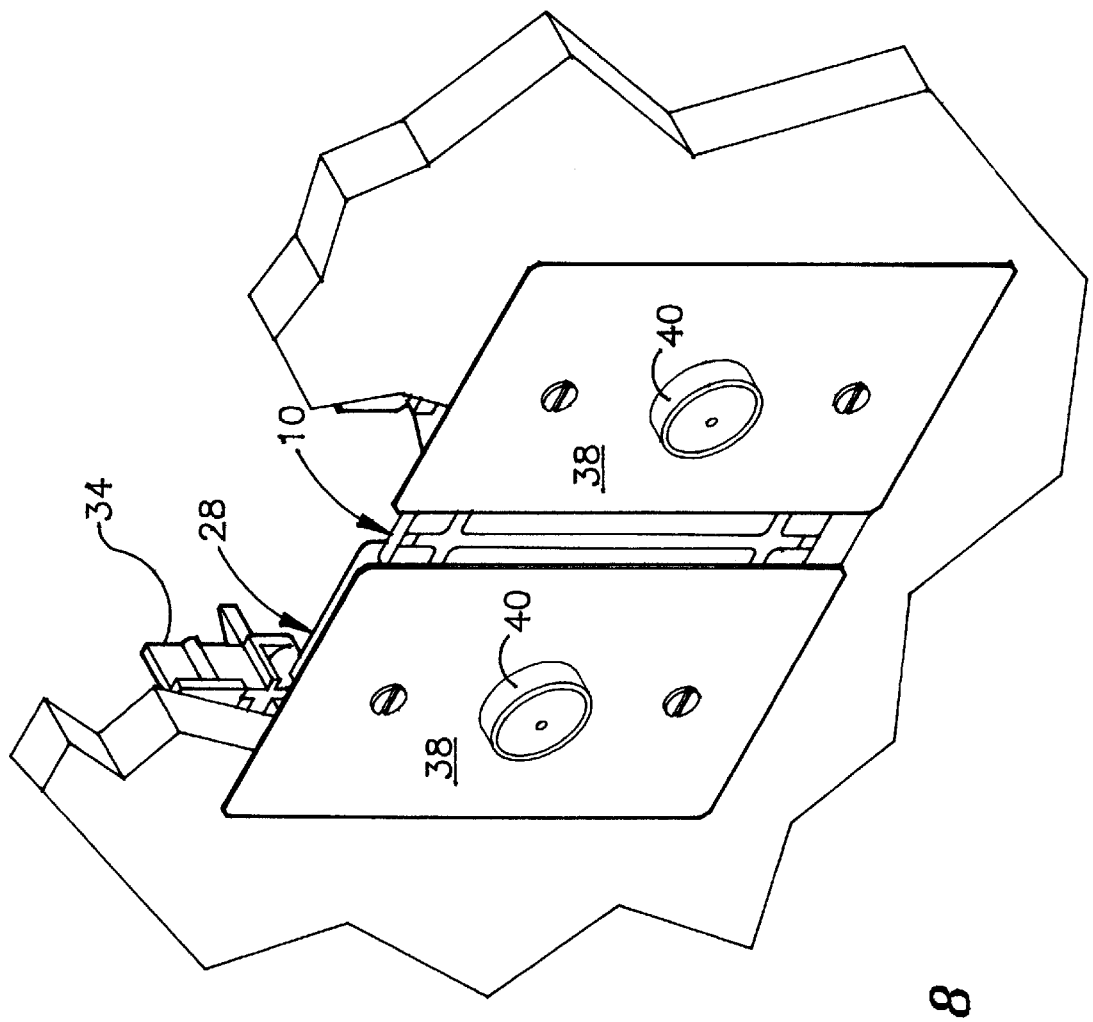
FIG. 8 is a perspective schematic view partially broken away showing how mounting plates representing schematic outlet receptacles are utilized with the spacer coupler and rectangular outlets.

With reference to FIG. 8 there is shown a schematic perspective partially cut away view of the invention with two rectangular outlets. The outlets illustrate a schematic type of connection which connection may be for optical fiber cable, coaxial cable, twisted pair cables, etc. The face plate 38 and receptacle 40 may either already exist in an installation or purchased for the installation.

The spacer coupler and gang of rectangular outlets must accommodate a number of different receptacles and a number of different faceplates. By utilizing the invention, two or more rectangular outlets 28 can be ganged together using the spacer couplers. Two are ganged using a single coupler but it could be any number desired. Using the invention, a rectangular cut out is made in the wall which in width and height is large enough to accommodate the height of the side wall 32 of the rectangular outlet and a width that extends from the outside vertical side wall of one rectangular outlet to the outside of the vertical side wall of the rectangular outlet at the end of the gang. Thus only a single rectangular hole needs to be made to accommodate a variety of receptacles. The rectangular outlets are held in place behind the thickness in the building wall by the flags on the interior and the flanges on the room side of the wall to clamp the receptacles in position.

The use of the spacer coupler of this invention permits the joining together of two or more rectangular outlets in a building wall to provide a constant distance between the adjacent outlets the spacer coupler and locks them into position so that they will not come apart. This guarantees consistent alignment.

The invention is primarily for use in offices that have phone systems and/or other communication systems in place or where a new system is to be installed. In the case of an old system, it is not necessary for removal for as the new system can be installed next to or parallel to the existing system. It makes the entire arrangement neat and orderly. These systems can accommodate telephone and other communication systems including optical cable. Also the system can be used to accommodate rectangular outlet boxes in the form of electrical outlets when they are utilized with various devices that may have a variety of face plates of generally a similar dimension. Thus this new invention permits a spacer coupler to gang a variety of single outlets in a row so that they can be snapped together to accommodate as many as the installation requires.

Although there has been shown and described an example of what is at present considered the preferred embodiment of a spacer coupler and spacer coupler combination, it will be obvious to those skilled in the art that various changes and modifications may be made therein without departing from the scope of the invention as defined by the appended claims.

What is claimed is:

1. In combination:
  A) at least two generally rectangular, outlet boxes having opposing generally planar vertical sides, at least one of said generally planar vertical sides including at least one aperture therein; and
  B) at least one spacer coupler comprising a generally rectangular flat plate having opposing generally planar sides and at least one integral spear connector extending from each of said opposing generally planar sides to provide opposing spear connectors;
  said opposing spear connectors and said apertures oriented such that each of said opposing spear connectors engages one of said apertures when said spacer coupler is placed between two of said generally rectangular outlet boxes and said boxes are forced together to gang said generally rectangular outlet boxes.

2. The combination of claim 1 wherein said opposing spear connectors have a pointed entrance end and two locking fingers that may be compressed toward one another.

3. The spacer coupler of claim 1 wherein said opposing spear connectors have a pointed end and are forked so that said pointed end can be compressed onto itself through the use of a bally end flexible carrier.

* * * * *